(12) United States Patent
Goddard et al.

(10) Patent No.: US 11,531,318 B2
(45) Date of Patent: *Dec. 20, 2022

(54) WORKPIECE POSITIONER AND WELDING SEQUENCER

(71) Applicant: Lincoln Global, Inc., Santa Fe Springs, CA (US)

(72) Inventors: Brad J. Goddard, Rock Island, IL (US); Thomas C. Banks, Bettendorf, IA (US); Mark A. Hann, LeClair, IA (US); Shaun A. Zahradka, Port Byron, IL (US); Ryan J. Rezabek, Bettendorf, IA (US); Bradley R. Petersen, Bryant, IA (US); Charles R. Schlue, Davenport, IA (US); Bruce J. Chantry, Solon, OH (US); Joseph A. Daniel, Sagamore Hills, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,900

(22) Filed: Oct. 6, 2020

(65) Prior Publication Data

US 2021/0018894 A1    Jan. 21, 2021

Related U.S. Application Data

(63) Continuation of application No. 15/904,570, filed on Feb. 26, 2018, now Pat. No. 10,845,778.

(Continued)

(51) Int. Cl.
*G05B 19/402* (2006.01)
*B23K 37/04* (2006.01)
(Continued)

(52) U.S. Cl.
CPC .......... *G05B 19/402* (2013.01); *B23K 9/1062* (2013.01); *B23K 9/32* (2013.01);
(Continued)

(58) Field of Classification Search
CPC ........ G05B 19/402; G05B 2219/37217; G05B 19/0423; G05B 19/054; B23K 9/1062;
(Continued)

(56) References Cited

U.S. PATENT DOCUMENTS

| | | |
|---|---|---|
| 4,538,956 A | 9/1985 | Kalkbrenner et al. |
| 5,023,444 A * | 6/1991 | Ohman ............... F16P 3/16 |
| | | 180/274 |

(Continued)

FOREIGN PATENT DOCUMENTS

| | | | |
|---|---|---|---|
| CN | 203380552 U | * | 1/2014 |
| JP | 3-52798 A | | 3/1991 |

(Continued)

*Primary Examiner* — Thomas C Lee
*Assistant Examiner* — Charles Cai
(74) *Attorney, Agent, or Firm* — David J. Muzilla

(57) ABSTRACT

Embodiments of welding work cells are disclosed. One embodiment includes a workpiece positioning system, a welding power source, and a welding job sequencer. The workpiece positioning system powers an elevating motion and a rotational motion of a workpiece mounted between a headstock and a tailstock to re-position the workpiece for a next weld to be performed. The welding power source generates welding output power based on a set of welding parameters of the power source. The welding job sequencer commands the workpiece positioning system to re-position the workpiece from a current position to a next position in accordance with a next step of a welding sequence of a welding schedule. The welding job sequencer also commands the welding power source to adjust a current set of welding parameters to a next set of welding parameters in (Continued)

accordance with the next step of the welding sequence of the welding schedule.

18 Claims, 8 Drawing Sheets

Related U.S. Application Data

(60) Provisional application No. 62/535,272, filed on Jul. 21, 2017, provisional application No. 62/478,704, filed on Mar. 30, 2017.

(51) Int. Cl.
*B23K 31/02* (2006.01)
*B23K 9/10* (2006.01)
*B23K 37/047* (2006.01)
*B23K 37/00* (2006.01)
*B23K 9/32* (2006.01)
*B23K 10/00* (2006.01)

(52) U.S. Cl.
CPC .............. *B23K 10/00* (2013.01); *B23K 31/02* (2013.01); *B23K 37/006* (2013.01); *B23K 37/04* (2013.01); *B23K 37/047* (2013.01); *B23K 37/0452* (2013.01); *G05B 2219/37217* (2013.01)

(58) Field of Classification Search
CPC .......... B23K 9/32; B23K 10/00; B23K 31/02; B23K 37/006; B23K 37/04; B23K 37/0452; B23K 37/047; B23K 37/00; B23K 9/1006; G06Q 50/04
See application file for complete search history.

(56) References Cited

U.S. PATENT DOCUMENTS

| | | |
|---|---|---|
| 5,801,353 A | 9/1998 | Pirilä |
| 5,948,521 A | 9/1999 | Dlugosch et al. |
| 6,305,678 B1 | 10/2001 | Hammersmith et al. |
| 9,104,195 B2 | 8/2015 | Daniel et al. |
| 9,167,894 B2 | 10/2015 | DesRoches et al. |
| 2003/0002946 A1 | 1/2003 | Hsieh |
| 2004/0256366 A1 | 12/2004 | Kim et al. |
| 2009/0120330 A1* | 5/2009 | Stoops ................. B23Q 1/5475 108/7 |
| 2010/0170879 A1* | 7/2010 | Kanaya ................ B23K 11/093 219/104 |
| 2010/0244347 A1 | 9/2010 | Davi |
| 2013/0119036 A1* | 5/2013 | Daniel ................... B23K 9/095 219/130.21 |
| 2013/0126500 A1 | 5/2013 | Cruickshank |
| 2013/0334188 A1* | 12/2013 | Enyedy .................. B23K 9/095 219/130.21 |
| 2014/0042135 A1* | 2/2014 | Daniel ..................... B23K 9/10 219/130.5 |
| 2014/0208986 A1 | 7/2014 | DesRoches et al. |
| 2014/0263227 A1 | 9/2014 | Daniel et al. |
| 2016/0031110 A1* | 2/2016 | Middleton .............. B27B 31/06 83/13 |
| 2016/0375524 A1 | 12/2016 | Hsu |

FOREIGN PATENT DOCUMENTS

| | | |
|---|---|---|
| JP | 2002-224831 A | 8/2002 |
| JP | 2005-297017 A | 10/2005 |
| JP | 2007-38334 A | 2/2007 |
| JP | 2007-290025 A | 11/2007 |
| JP | 2008-59116 A | 3/2008 |
| JP | 2010-67077 A | 3/2010 |
| JP | 2011-224661 A | 11/2011 |
| JP | 2017-039168 A | 2/2017 |

\* cited by examiner

WORKPIECE POSITIONER AND WELDING SEQUENCER

CROSS REFERENCE TO RELATED APPLICATIONS/INCORPORATION BY REFERENCE

This U.S. patent application is a continuation of and claims priority to and the benefit of U.S. patent application Ser. No. 15/904,570 filed on Feb. 26, 2018, which is incorporated herein by reference in its entirety. U.S. patent application Ser. No. 15/904,570 filed on Feb. 26, 2018 claims priority to and the benefit of U.S. provisional patent application Ser. No. 62/478,704 filed on Mar. 30, 2017, which is incorporated herein by reference in its entirety. U.S. patent application Ser. No. 15/904,570 filed on Feb. 26, 2018 also claims priority to and the benefit of U.S. provisional patent application Ser. No. 62/535,272 filed on Jul. 21, 2017, which is incorporated herein by reference in its entirety. U.S. Pat. No. 9,104,195 issued on Aug. 11, 2015 is incorporated herein by reference in its entirety.

FIELD

Embodiments of the present invention relate to systems, apparatus, and methods related to welding or cutting positioners, for holding workpieces to be welded or cut, and welding sequencing providing selectable and controllable motion profiles from a welding sequence.

BACKGROUND

Large workpieces are difficult to get into position to be welded or cut such that a human operator can interact with the workpieces in an ergonomic and safe manner. Human operators typically need to work while climbing up and down ladders and/or complete their work in positions that are not ergonomically friendly. A workpiece positioner is often used to manipulate a position of a large workpiece. The workpiece positioner has to be reprogrammed whenever a new position or a change in position is desired by a customer for a particular workpiece. Large workpieces often have many welds to be made and are susceptible to a human operator missing or forgetting to create one or more of the welds. A more effective solution is needed that allows for desired positioning of workpieces during a welding process while tracking the welds.

SUMMARY

Embodiments of the present invention provide a workpiece positioning system that is directed by a welding job sequencer. In one embodiment, a welding job sequencer provides position commands of a welding sequence to a workpiece positioning system holding a large workpiece. As the welding job sequencer progresses through the steps of a welding schedule, the large workpiece is re-positioned by the workpiece positioning system, as commanded by the welding job sequencer, to put the large workpiece in an optimum position for welding by a human operator. Numerous aspects of the general inventive concepts will become readily apparent from the following detailed description of exemplary embodiments, from the claims and from the accompanying drawings.

In one embodiment, a welding work cell is provided. The welding work cell includes a workpiece positioning system, including a headstock structure and a tailstock structure. The workpiece positioning system is configured to power an elevating motion and a rotational motion of a workpiece mounted between the headstock structure and the tailstock structure to re-position the workpiece for a next weld to be performed by a human operator. The welding work cell also includes a welding power source configured to generate welding output power based on a current set of welding parameters of the power source. The welding power source is part of a welding system used by the human operator for welding the workpiece. The welding work cell further includes a welding job sequencer in communication with the workpiece positioning system and the welding power source. The welding job sequencer is configured to command the workpiece positioning system to re-position the workpiece from a current position to a next position in accordance with a next step of a welding sequence of a welding schedule. The welding job sequencer is also configured to command the welding power source to adjust the current set of welding parameters to a next set of welding parameters in accordance with the next step of the welding sequence of the welding schedule. In one embodiment, the welding job sequencer includes a memory that stores a set of user profiles. The next position commanded by the welding job sequencer is adjusted based on a user profile of the set of user profiles corresponding to the human operator when the human operator is logged into at least one of the welding job sequencer, the welding power source, or the workpiece positioning system. Also, the next set of welding parameters commanded by the welding job sequencer is adjusted based on a user profile of the set of user profiles corresponding to the human operator when the human operator is logged into at least one of the welding job sequencer, the welding power source, or the workpiece positioning system. In one embodiment, the workpiece positioning system includes an interface controller. The interface controller includes a communication interface configured to communicate with at least the welding job sequencer, a memory storing at least one of user profiles or runtime files that include program data that is compiled and saved in an executable format to be used for human/machine interface (HMI) applications, at least one of a processor or a programmable logic controller, and a human/machine interface (HMI) including at least one of a graphical touch panel interface or push buttons. In one embodiment, the workpiece positioning system includes a first hydraulic cylinder, a first pair of liner rails with bearings, a first hydraulic power unit, and a first linear encoder housed in the headstock structure. The workpiece positioning system also includes a second hydraulic cylinder, a second pair of liner rails with bearings, a second hydraulic power unit, and a second linear encoder housed in the tailstock structure. The first hydraulic cylinder, the first hydraulic power unit, the second hydraulic cylinder, and the second hydraulic power unit are configured to power the elevating motion of the workpiece along the first pair of linear rails and the second pair of linear rails in synchronization. The synchronization is provided by the first linear encoder and the second linear encoder. In one embodiment, the welding job sequencer includes a communication interface configured to communicate with at least the workpiece positioning system and the welding power source. The welding job sequencer also includes a memory storing at least one of welding schedules, user profiles, or runtime files that include program data that is compiled and saved in an executable format to be used for human/machine interface applications. The welding job sequencer further includes a processor and a human/machine interface (HMI) configured to provide the human operator with commands and instructions corresponding to the next weld to be performed by the human operator. In one embodiment, the welding power source includes a communication interface configured to communicate with at least the welding job sequencer, a memory storing a set of user profiles and sets of welding parameters, power generation electronics, a waveform generator, a processor/controller, and a human/machine interface (HMI).

In one embodiment, a method of manipulating a welding work cell is provided. The method includes a welding job sequencer of the welding work cell sending first command data to a workpiece positioning system of the welding work cell holding a workpiece between a headstock structure and a tailstock structure in a current position. The first command data corresponds to a next position in accordance with a next step of a welding sequence of a welding schedule. The method also includes the workpiece positioning system re-positioning the workpiece from the current position to the next position in response to the first command data. The method further includes the welding job sequencer sending second command data to a welding power source of the welding work cell configured to generate welding output power based on a current set of welding parameters. The second command data corresponds to a next set of welding parameters in accordance with the next step of the welding sequence of the welding schedule. The method also includes the welding power source adjusting the current set of welding parameters to the next set of welding parameters in response to the second command data. In one embodiment, the method includes the workpiece positioning system sending confirmation data to the welding job sequencer to confirm that the workpiece has been properly re-positioned in accordance with the first command data. In one embodiment, the method includes the welding power source sending confirmation data to the welding job sequencer to confirm that the current set of welding parameters have been properly adjusted to the next set of welding parameters in accordance with the second command data. In one embodiment, the method includes displaying instructions, corresponding to the next step of the welding sequence, on a human/machine interface (HMI) of the welding job sequencer to instruct a human operator to perform a next welding operation on the workpiece. In one embodiment, the first command data is sent wirelessly from the welding job sequencer to the workpiece positioning system. In one embodiment, the second command data is sent wirelessly from the welding job sequencer to the welding power source. In one embodiment, the method includes modifying at least one of the first command data and the second command data based on a user profile of a human operator logged in to at least one of welding job sequencer, the workpiece positioning system, or the welding power source.

In one embodiment, a networked welding work cell is provided. The networked welding work cell includes a workpiece positioning system, including a headstock structure and a tailstock structure. The workpiece positioning system is configured to power an elevating motion and a rotational motion of a workpiece mounted between the headstock structure and the tailstock structure to re-position the workpiece for a next weld to be performed by a human operator. The networked welding work cell also includes a welding power source configured to generate welding output power based on a current set of welding parameters of the power source. The welding power source is part of a welding system used by the human operator for welding the workpiece. The networked welding work cell further includes a computerized network and a welding job sequencer in communication with the workpiece positioning system and the welding power source via the computerized network. The welding job sequencer is configured to command the workpiece positioning system to re-position the workpiece from a current position to a next position in accordance with a next step of a welding sequence of a welding schedule. The welding job sequencer is also configured to command the welding power source to adjust the current set of welding parameters to a next set of welding parameters in accordance with the next step of the welding sequence of the welding schedule. In one embodiment, the networked welding work cell includes a body proximity sensor configured to sense when the human operator is not in a safe location and to stop movement of the workpiece positioning system in response to sensing when the human operator is not in a safe location. In one embodiment, the networked welding work cell includes a scanner configured to read workpiece information encoded on the workpiece and send the workpiece information to the welding job sequencer. The welding job sequencer is configured to select the welding schedule from a plurality of welding schedules based on the workpiece information. In one embodiment, the computerized network includes at least one of a server computer and a network storage device storing user profiles. In one embodiment, the networked welding work cell is configured as at least one of a local area network or a wide area network. In one embodiment, the networked welding work cell is configured as a wireless network.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Industrial positioning systems can be used to hold and position large or cumbersome workpieces that are to be welded or cut. In accordance with embodiments of the present invention, such workpieces are no longer difficult to get into position to be welded or cut and a human operator can interact with the workpieces in an ergonomic and safe manner. With the embodiments disclosed herein, human operators are much less likely to have to climb up and down ladders and/or perform their work in positions that are not ergonomically friendly. Furthermore, the embodiments disclosed herein provide a more cost effective solution that allows for desired positioning of such workpieces. Even though the detailed description herein focuses on welding (e.g., arc welding), the concepts and functions herein are equally applicable to cutting (e.g., plasma cutting).

Embodiments of workpiece positioning systems are disclosed for holding and orienting large workpieces to be welded or cut. In one embodiment, a workpiece positioning system is configured to hold a large workpiece to be welded or cut at a height that is adjustable and allows the workpiece to be rotated at that height along one or more axes. In one embodiment, a welding job sequencer interfaces to the workpiece positioning system to command movement or re-positioning of the large workpiece by the workpiece positioning system while progressing through a welding sequence of a welding schedule. The welding positioning system has two axes of motion, with one rotational axis oriented horizontally and connected to the workpiece. The other axis is a linear vertical travel axis to which the rotational axis is connected, allowing height to be set as desired. The welding positioning system uses hydraulic cylinders to adjust workpiece position, in accordance with one embodiment.

Figure 1:
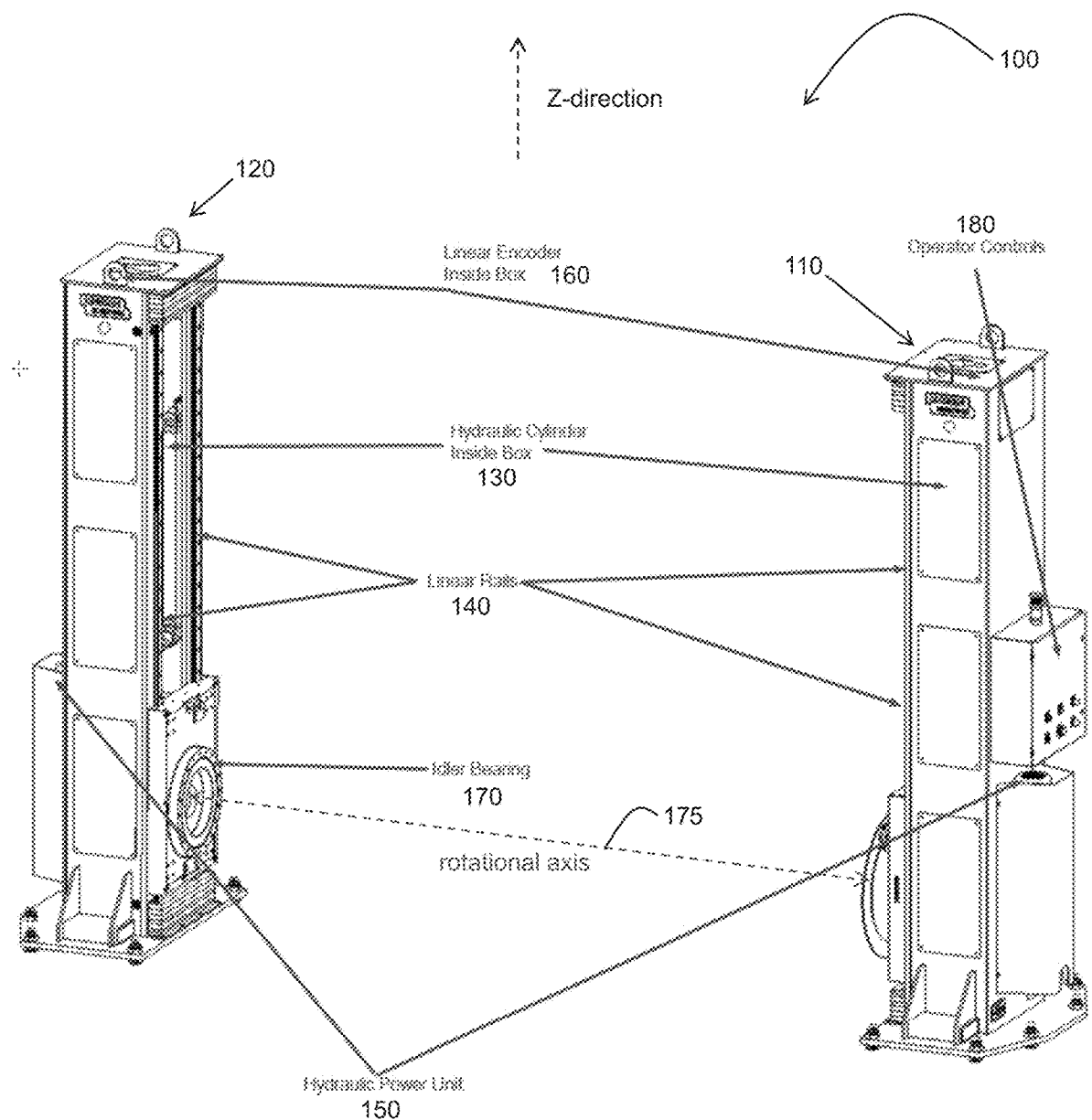
FIG. 1 illustrates one embodiment of a workpiece positioning system having two sections that are separated from each other such that one end of a large workpiece may be attached to one section (e.g., a headstock) and the other end of the large workpiece may be attached to the other section (e.g., a tailstock)

Referring now to the drawings, which are for the purpose of illustrating exemplary embodiments of the present invention only and not for the purpose of limiting same, FIG. 1 illustrates an embodiment of a workpiece positioning system 100 (e.g., a hydraulic elevating z-axis welding positioning system) having two sections. The two sections are separated from each other such that one end of a large workpiece may be attached to the one section (e.g., a headstock 110) and the other end of the large workpiece may be attached to the other section (e.g., a tailstock 120). The z-axis height of each section may be adjusted independently (or in a coordinated manner) and set via hydraulic control, in accordance with one embodiment. Furthermore, the workpiece may be rotated to a desired orientation via hydraulic control such that a human operator can perform a next weld on the workpiece.

In accordance with one embodiment, two fabricated sections of the positioning system make up the headstock 110 and the tailstock 120, respectively. Each section houses a hydraulic cylinder 130, a pair of linear rails with bearings 140, a hydraulic power unit 150, a linear encoder 160, and either a powered rotation drive or an idler bearing 170. The elevation motion of each section 110, 120 is powered by the hydraulic power unit 150 and the cylinder 130, which is guided by the linear rails and bearings 140. The linear encoders 160 ensure that the elevating motion along the pair of linear rails with bearings 140 remains synchronized. Rotation is also powered by one of the hydraulic power units 150 (e.g., for rotation about a horizontal rotational axis 175). Encoders associated with the rotation are also provided to ensure that the rotational motion about the rotational axis 175 remains synchronized. The encoders provide positional feedback to the interface controller 180 (discussed below). In general, the hydraulic configuration of the positioning system 100 can be offered at a significantly lower cost than, for example, positioning systems that use servo motors and ball screws for elevation, and servo motors and precision gear boxes for rotation.

In one embodiment, the positioning system 100 is controlled via an interface controller 180 (operator controls in FIG. 1) mounted to the headstock 110. The interface controller 180 may include (e.g., see FIG. 3), for example, a processor and/or programmable logic controller (PLC) and a graphical touch panel interface in tandem with physical pushbuttons to provide an intuitive human operator interaction for human operator control of the positioning system 100. The interface controller 180 also allows interfacing to other external systems such as, for example, a welding job sequencer. In one embodiment, a welding job sequencer interfaces to and communicates with the positioning system 100 to guide the positioning system 100 and the human operator through a sequence of welds on a large workpiece, as described in more detail later herein (e.g., see FIG. 2).

In one embodiment, control cables and hydraulic lines are enclosed and routed within a steel frame of the main structure where they are protected from damage. In general, embodiments of the positioning system 100 are fabricated to operate in an industrial factory environment. In some embodiments, the positioning system 100 is a standalone product. In other embodiments, the positioning system 100 may be integrated with other products (e.g., welding or cutting systems). Positioning systems may be of different types, in accordance with various embodiments. For example, a positioning system may be a hydraulically controlled type as described above, or may be, for example, a servo controlled type or a sky hook type of positioner. Any type of positioner may be configured to operate in combination with a welding job sequencer, in accordance with various embodiments.

In an exemplary embodiment, a welding job sequencer is provided. The welding job sequencer improves the semi-automatic work cell of the related art by increasing the productivity of the semi-automatic work cell without compromising the number of weld schedules usable therein. The welding job sequencer accomplishes this improvement by implementing automatic changes in the semi-automatic work cell (e.g., the positioning system 100), and by providing the human operator with an array of commands and instructions.

More specifically, in an exemplary embodiment, the welding job sequencer automatically selects and implements a function of the welding work cell. An example of such a function includes a particular weld schedule to be used with the semi-automatic work cell. In other words, the welding job sequencer may select a weld schedule to be used for a particular welding operation, and modify the settings of the semi-automatic work cell (e.g., the positioning system 100) in accordance with the selected weld schedule, automatically for the human operator (i.e., without the human operator's specific intervention).

Additionally, in the exemplary embodiment, the welding job sequencer automatically indicates a sequence of operations that the human operator should follow to create a final welded assembly. In conjunction with the automatic selection of welding schedules, this indicated sequence allows a human operator to follow the sequence to create a final welded part, without having to spend time adjusting, selecting, or reviewing each individual weld schedule and/or sequence.

Accordingly, since the welding job sequencer sets up the welding equipment and positioning system, and organizes the workflow, and since the human operator only performs the welding operations themselves, the chance for error in the welding operation is greatly reduced, and productivity and quality are improved. Opportunities for errors, missed welds, and wrong procedures are eliminated.

Figure 2:
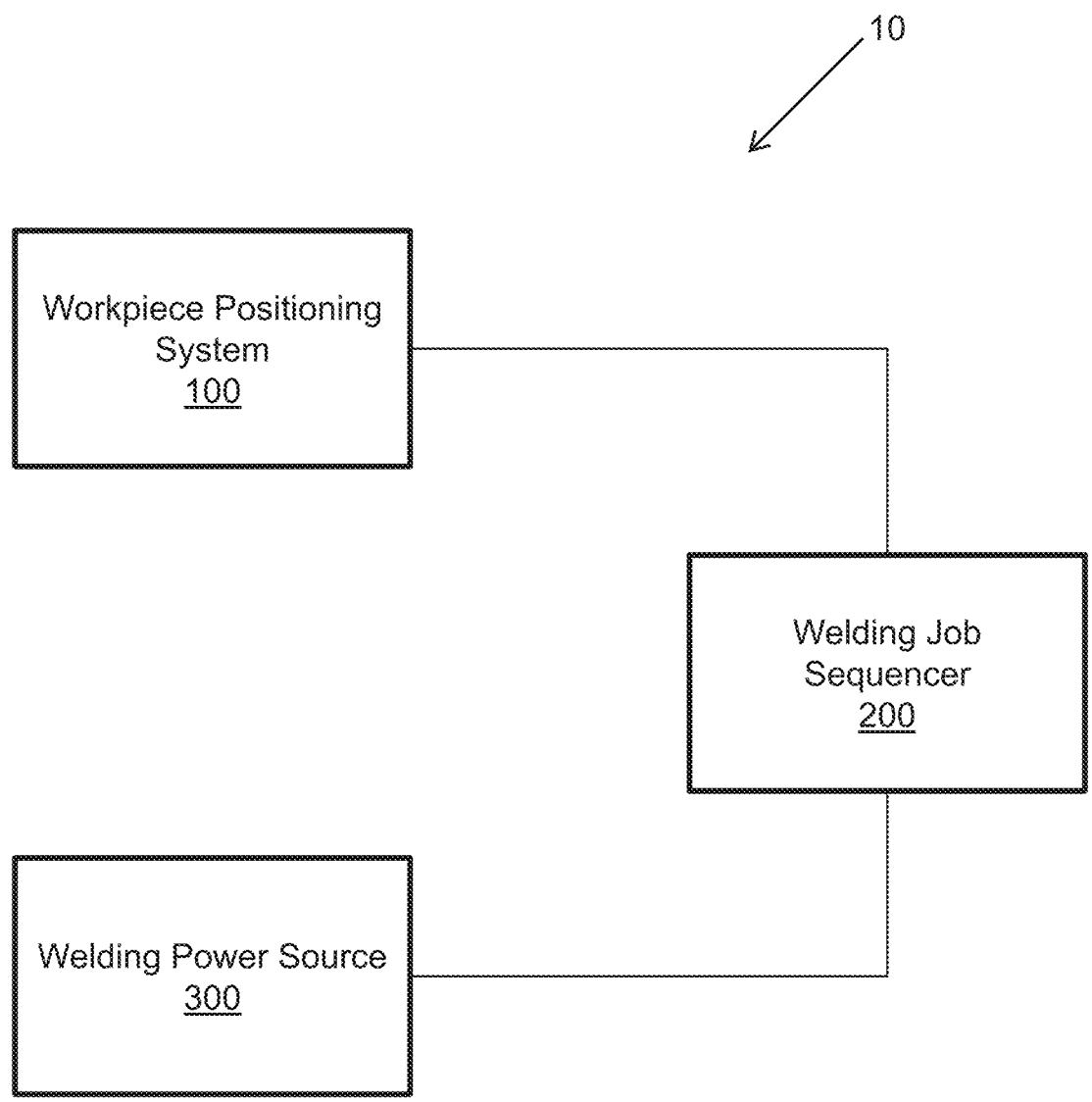
FIG. 2 is a system block diagram illustrating one embodiment of a system (e.g., a welding work cell) having a welding power source, a workpiece positioning system, and a welding job sequencer.

In accordance with one embodiment, the welding job sequencer is a computer having a user interface (e.g., a human machine interface or HMI). The welding job sequencer may communicate with the positioning system via wired means (e.g., via a cable) or wireless means, in accordance with various embodiments. In another embodiment, the welding job sequencer communicates with the positioning system through a computerized network (e.g., as part of a local area network, a wide area network, or the internet . . . e.g., see FIG. 6). The computerized network includes, for example, a server computer. In a similar manner, the welding job sequencer may communicate with a welding power source of a welding system. FIG. 2 illustrates a welding job sequencer 200 operationally connected to a welding power source 300 and a positioning system 100 as part of a welding work cell 10. The welding power source 300 is part of a welding system used by a human operator for welding a workpiece. A welding system may include not only a welding power source but also a wire feeder, a welding gun, and tanks of gases used in welding, for example. Other elements of a welding system are possible as well, in accordance with other embodiments.

In one embodiment, the welding job sequencer 200 commands the positioning system 100 to move a large workpiece into an optimum position (e.g., z-axis height and rotation) for a weld (or a sequence of welds) to be made by a human operator as the welding job sequencer 200 steps through a sequence of welds to be made on the workpiece. For example, as one weld (or weld sequence) is completed and a next weld (or weld sequence) is to be made, the welding job sequencer 200 communicates with the interface controller 180 of the positioning system 100 to command the positioning system 100 to move to the pre-programmed optimum position for that next weld (or weld sequence). The interface controller 180 of the positioning system 100 may communicate back to the welding job sequencer 200 to verify (confirm) that the workpiece is in the commanded position. The welding job sequencer 200 may then display to the human operator instructions associated with that next weld (or weld sequence) to be made. The human operator can then follow the displayed instructions to create the next weld using the welding system. In one embodiment, the welding job sequencer 200 communicates with the power source 300 of the welding system to, for example, adjust parameters (e.g., welding parameters) of the power source 300 for the next weld. The power source 300 may communicate back to the welding job sequencer 200 to confirm that the adjustments have been made.

As an example, in one embodiment, when the welding job sequencer 200 hits a step in a welding sequence, the welding job sequencer 200 writes an integer value to the PLC (e.g., see FIG. 3) of the positioning system 100 corresponding to a position to which the workpiece is to be moved. The PLC provides feedback to the welding job sequencer 200 to verify that the PLC received the correct integer value. Once verified, the PLC triggers movement of the workpiece to the corresponding position. The PLC reports back to the welding job sequencer 200 to indicate when the move is properly completed.

In accordance with another embodiment, the human operator uses the interface controller 180 of the positioning system 100 to change the position (e.g., height and rotation) of the large workpiece. The interface controller 180 of the positioning system 100 then communicates to the welding job sequencer 200 that the workpiece is in the proper position for the next weld. In accordance with various embodiments, the welding job sequencer 200 can be integrated with various tooling or other systems to provide checks and balances with respect to the welding environment and safety concerns. For example, parts-in-place checks can be performed by the welding job sequencer 200 to verify that various parts are in the proper position before proceeding with welding. Automatic clamping may be employed to keep a part in place until approval is obtained to move the part. The welding job sequencer 200 may not allow the human operator to proceed to weld until the human operator has put the workpiece in the correct position.

Furthermore, the welding job sequencer 200 may not allow the human operator to move the workpiece unless the human operator is adequately clear of the workpiece. A body proximity sensor (e.g., a light curtain or a pressure-sensitive safety pad) (e.g., see FIG. 6) may be employed with the welding job sequencer 200 to stop the positioning system 100 and/or the welding system when the human operator is not in a safe location. For example, an operator may interrupt a safety curtain during motion of a workpiece by the positioning system 100, causing welding to stop. A safety inspector may have to come and check out the situation before the human operator can proceed with the welding operation. This facilitates continuous improvement by providing immediate feedback to identify and eliminate problems. In general, various embodiments provide the ability to identify the location of a human operator with respect to the workpiece being welded and/or moved by the positioning system 100 and automatically stop the positioning system 100 when the human operator goes out of bounds.

In one embodiment, the welding job sequencer 200 accommodates long welds (e.g. 100 seconds) on a workpiece where the workpiece is to be moved during the long weld. Time intervals are tied to positions of the workpiece within the welding job sequencer 200. During creation of the long weld, the welding job sequencer 200 commands the positioning system 100 to re-position the workpiece after certain time intervals, based on how long it should take the human operator to get through the long weld at various points (e.g., based on a typical known travel speed for the human operator). For example, the workpiece may be indexed up or down, or rotated at certain times to keep the position of the workpiece in a "head down" welding position relative to the human operator. Safety measures are put in place, in accordance with one embodiment, to account for the fact that the workpiece is being moved while the human operator is welding. When the welding job sequencer 200 senses (e.g., from the welding power source 300) that the weld is taking too long (e.g., 105 seconds) or finished too soon (e.g., 95 seconds), a flag or an alert is generated, in accordance with one embodiment. The flag or alert may be displayed to the human operator via the interface controller 180 to indicate to the human operator that the weld is under-welded or over-welded.

In one embodiment, user-specific set-ups are provided based on user profiles. A human operator is identified and the welding job sequencer 200 customizes a welding set up for that human operator. A user (human operator) can log in to the welding cell via the interface controller 180 on the positioning system 100, via a user interface associated with the welding job sequencer 200, or via a user interface associated with the welding power source 300, for example. Once logged in, a user profile associated with that human operator is selected and used to inform the welding job sequencer 200 to modify the welding set-up for that human operator. The user profile may be stored in the welding job sequencer 200, the positioning system 100, the welding power source 300, or on a storage device of a network (e.g., see FIG. 6), in accordance with various embodiments. The welding job sequencer 200 applies the user profile to a standard programmed sequence associated with the workpiece to be welded such that the workpiece is positioned in an optimal ergonomic position for that specific human operator.

In one embodiment, the welding job sequencer 200 applies offsets to the standard programmed sequence based on the user profile. For example, a height offset may be applied for the workpiece to account for the height of the human operator. For a tall human operator, a height in the standard programmed sequence may be increased, based on the height of the human operator obtained from the user profile. Similarly, for a short human operator, a height in the standard programmed sequence may be decreased. Other user profile preferences may be used to apply offsets to a standard programmed sequence as well. For example, a preferred travel speed of the human operator may result in offsets to the times at which a position of the workpiece is to be changed (e.g., during a long weld).

In accordance with one embodiment, the workpiece is identified and, based on the identification of the workpiece, the welding job sequencer 200 selects the corresponding programmed welding sequence. In one embodiment, the human operator enters an identification of the workpiece into the welding job sequencer 200 or the positioning system 100 (e.g., via the interface controller 180). In another embodiment, an identification code or signal is read off of the workpiece by a scanner (e.g., via an RFID scanner reading an RFID tag on the workpiece) (e.g., see FIG. 6) and sent to the positioning system 100 or the welding job sequencer 200. In another embodiment, the system identifies the tooling put in place for the particular workpiece and automatically selects the welding sequence corresponding to the workpiece based on the identification of the tooling.

In one embodiment, the welding job sequencer 200 and the interface controller 180 of the positioning system 100 provide MER displays via an HMI. An MER file is a runtime file that includes program data that is compiled and saved in an executable format to be used for HMI applications. This allows a human operator to control the welding environment from either the welding job sequencer 200 or from the positioning system 100, which may be at different locations within the welding environment (providing multi-locational input and control). An HMI may provide a browser-type interface as a stateless type of user interface (e.g., less of an active Windows display providing a multi-location browser type of interface).

In one embodiment, the welding job sequencer 200 receives positional feedback from the positioning system 100 and records the position of the workpiece (e.g., flat, horizontal, vertical) in which the workpiece was actually welded by the human operator. The welding job sequencer 200 can determine whether or not such a position corresponds to a qualified procedure for the workpiece.

In one embodiment, a positioning system 100 with a welding job sequencer 200 allows for multiple human operator welding based on a sequence(s) for a single workpiece held and positioned by the positioning system 100. For example, in a dual human operator scenario, a first human operator works forward from the beginning of the sequence and a second human operator works backward from the end of the sequence. In this manner, the work is divided up between two or more human operators. Multiple sessions can be opened up in, for example, a web-based HMI to guide the multiple human operators and to track the status of each weld and indicate when all welds are completed for the workpiece.

Figure 3:
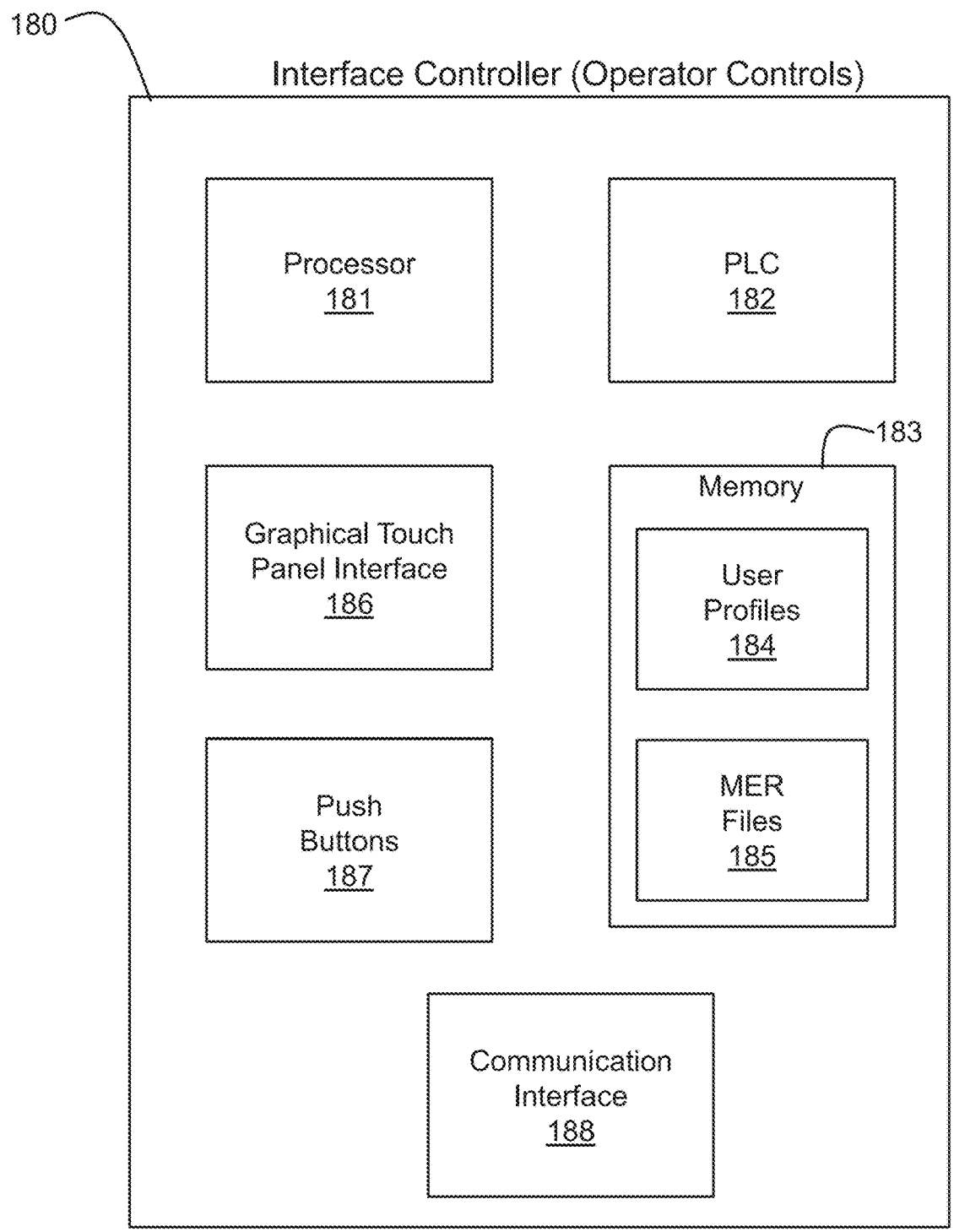
FIG. 3 is an apparatus block diagram illustrating one embodiment of an interface controller (operator controls) of the workpiece positioning system of FIG. 1 and FIG. 2.

FIG. 3 is an apparatus block diagram illustrating one embodiment of the interface controller 180 (operator controls) of the workpiece positioning system 100 of FIG. 1 and FIG. 2. The interface controller 180 includes a processor 181, a programmable logic controller (PLC) 182, and a memory 183. The memory 183 stores user profiles 184 (e.g., as files) and MER files 185. The user profiles 184 may include files of user characteristics including, for example, a height of each user, a reach of each user, physical limitations of each user, and a preferred welding travel speed of each user for particular types of welding. Other types of user characteristics may be possible as well, in accordance with other embodiments. The position information, the welding parameter information, and the user instructions of the welding schedule may be modified based on a user profile, in accordance with one embodiment.

An MER file is a runtime file that includes program data that is compiled and saved in an executable format to be used for human/machine interface (HMI) applications. The interface controller 180 also includes a graphical touch panel display 186 and push buttons 187 serving as an HMI. The interface controller 180 also includes a communication interface 188. The communication interface 188 may be a wireless communication interface (e.g., WiFi or Bluetooth®) and/or wired communication interface (e.g., copper cable or fiber optic cable), in accordance with various embodiments, and is configured to communicate with at least the welding job sequencer 200. In one embodiment, the communication interface 188 of the workpiece positioning system 100 is configured to communicate with a computerized network (e.g., see FIG. 6).

Figure 4:
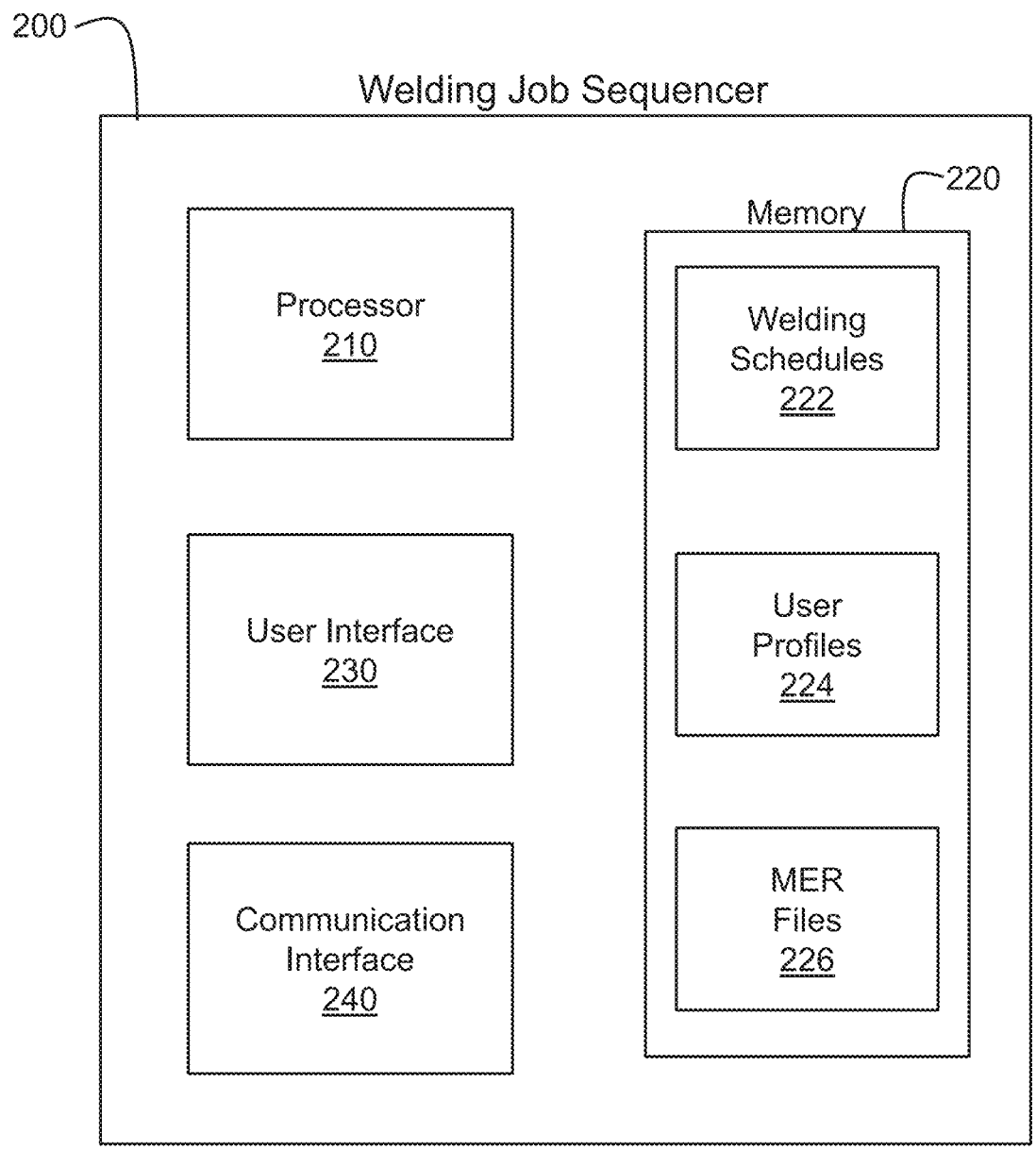
FIG. 4 is an apparatus block diagram illustrating one embodiment of the welding job sequencer of FIG. 2.

FIG. 4 is an apparatus block diagram illustrating one embodiment of the welding job sequencer 200 of FIG. 2. The welding job sequencer 200 includes a processor 210 and a memory 220 which can be accessed by the processor. The memory 220 stores at least welding schedules 222, user profiles 224, and MER files 226. The welding schedules 222 may be of the type described in U.S. Pat. No. 9,104,195 which is incorporated herein by reference in its entirety. In one embodiment, a welding schedule includes a sequence of steps corresponding to a sequence of welds to be made in accordance with the welding schedule. Each weld step within the welding schedule may provide, for example, position information corresponding to the desired position of the workpiece for that weld, welding parameter information (e.g., weld current, weld voltage, wire feed speed, etc.) corresponding to how the welding power source 300 should be set for the type of weld, and instructions for the user. The welding schedules 222 may be stored in the memory 220 in the form of computer-readable and/or computer-executable files, for example. The user profiles 224 may include files of user characteristics including, for example, a height of each user, a reach of each user, physical limitations of each user, and a preferred welding travel speed of each user for particular types of welding. Other types of user characteristics may be possible as well, in accordance with other embodiments. The position information, the welding parameter information, and the user instructions of the welding schedule may be adjusted or modified based on a user profile, in accordance with one embodiment.

The welding job sequencer 200 also includes a user interface 230 and a communication interface 240. The user interface 230 serves as an HMI, providing instructions (e.g., displayed and/or audible) to the user based on, for example, the selected weld sequence. The user interface 230 also allows the user to provide inputs to the welding job sequencer 200, for example, to allow the user to log in to the welding job sequencer 200. The communication interface 240 may be a wireless and/or wired communication interface, in accordance with various embodiments, and is configured to communicate with at least the interface controller 180 of the workpiece positioning system 100 and the welding power source 300. In one embodiment, the communication interface 240 is configured to communicate with a computerized network (e.g., see FIG. 6).

Figure 5:
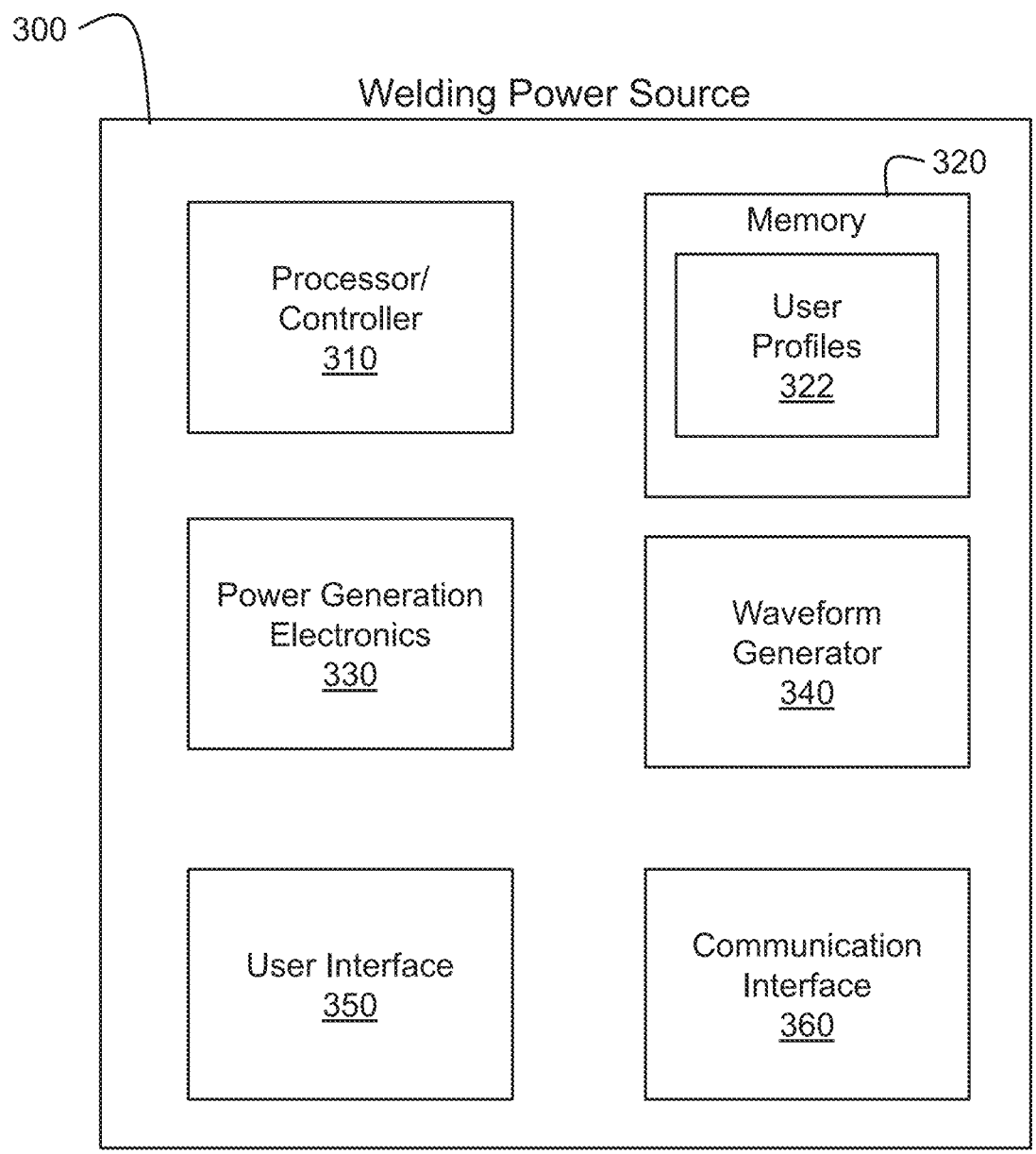
FIG. 5 is an apparatus block diagram illustrating one embodiment of the welding power source of FIG. 2.

FIG. 5 is an apparatus block diagram illustrating one embodiment of the welding power source 300 of FIG. 2. The welding power source is part of a welding system used by a human operator for welding a workpiece. The welding power source 300 generates output power for arc welding based on a current set of welding parameters. The welding power source 300 includes a processor/controller 310 and a memory 320 which can be accessed by the processor/controller 310. The memory 320 stores at least user profiles 322. The user profiles 322 may include files of user characteristics including, for example, a height of each user, a reach of each user, physical limitations of each user, and a preferred welding travel speed of each user for particular types of welding. Other types of user characteristics may be possible as well, in accordance with other embodiments. The position information, the welding parameter information, and the user instructions of the welding schedule may be modified based on a user profile, in accordance with one embodiment.

The welding power source 300 also includes power generation electronics 330, a waveform generator 340, a user interface 350, and a communication interface 360. The user interface 350 allows a user to interact with the welding power source 300 to, for example, select welding parameter settings. The communication interface 360 may be a wireless and/or wired communication interface, in accordance with various embodiments, and is configured to communicate with at least the welding job sequencer 200. In one embodiment, the communication interface 360 is configured to communicate with a computerized network (e.g., see FIG. 6).

Figure 6:
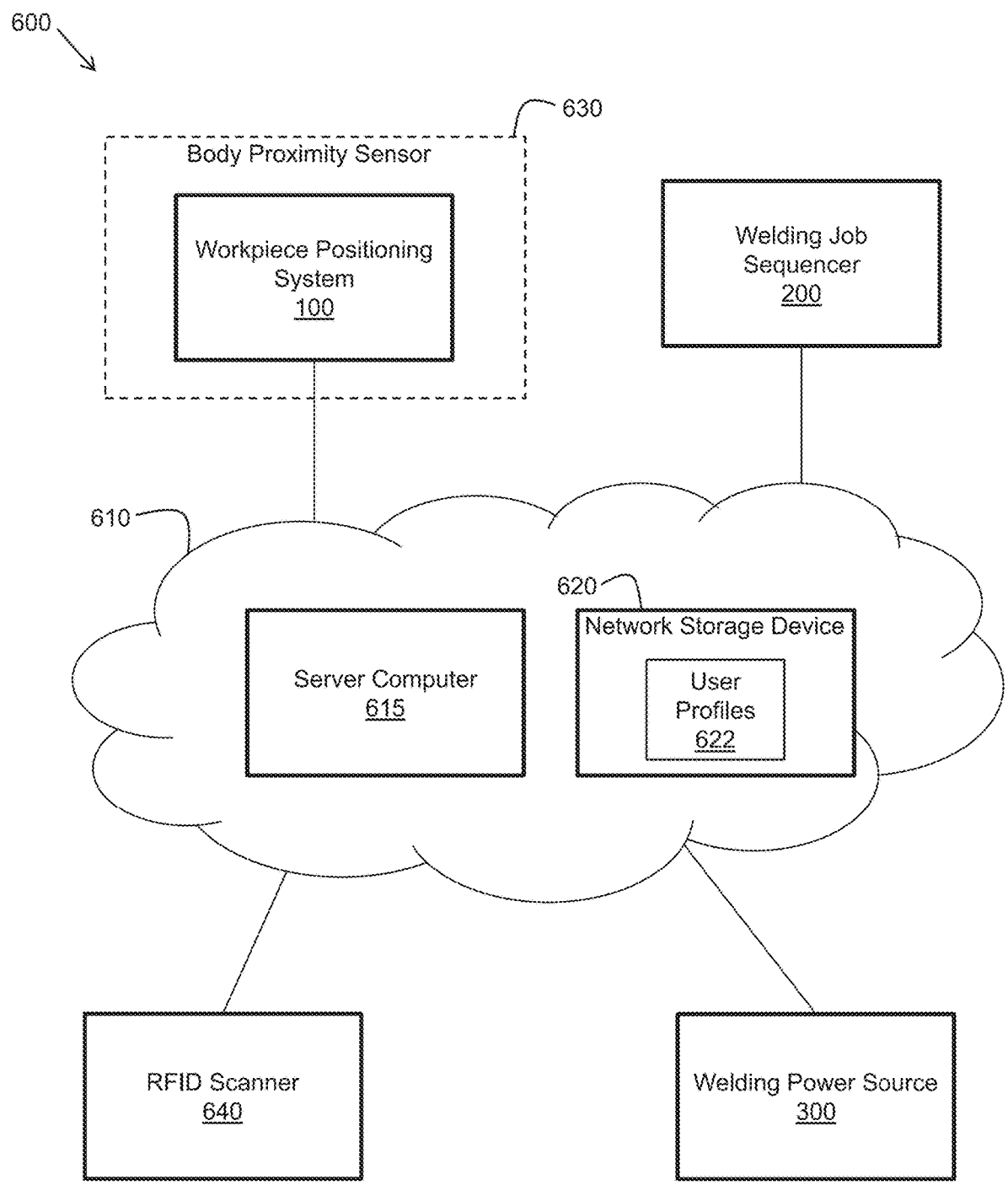
FIG. 6 is a system block diagram illustrating one embodiment of a system (e.g., a networked welding work cell)

FIG. 6 is a system block diagram illustrating one embodiment of a system 600 (e.g., a networked welding work cell). The system 600 may be configured as, for example, a local area network, a wide area network, or may be distributed across the internet, in accordance with various embodiments. The system 600 may be configured as a wired or wireless network, in accordance with various embodiments. The system 600 includes the workpiece positioning system 100 of FIG. 1, the welding job sequencer 200 of FIG. 4, and the welding power source 300 of FIG. 5. The system 600 also includes a computerized network 610 interfacing to the workpiece positioning system 100, the welding job sequencer 200, and the welding power source 300. The welding job sequencer 200 communicates with the workpiece positioning system 100 and the welding power source 300 via the computerized network 610.

In the embodiment of FIG. 6, the computerized network 610 includes a server computer 615 and a network storage device 620. The network storage device 620 stores at least a set of user profiles 622. The user profiles 622 may include files of user characteristics including, for example, a height of each user, a reach of each user, physical limitations of each user, and a preferred welding travel speed of each user for particular types of welding. Other types of user characteristics may be possible as well, in accordance with other embodiments. The position information, the welding parameter information, and the user instructions of the welding schedule may be modified based on a user profile, in accordance with one embodiment.

The networked welding work cell 600 also includes a body proximity sensor 630 positioned near (e.g., around) the workpiece positioning system 100. The body proximity sensor 630 senses when the human operator is not in a safe location and stops movement of the workpiece positioning system 100 in response to sensing when the human operator is not in a safe position. The body proximity sensor 630 may take the form of a light curtain or a pressure-sensitive safety pad, for example, in accordance with various embodiments. In one embodiment, the body proximity sensor 630 is operatively connected to the interface controller 180 of the workpiece positioning system 100.

Often times, the workpiece to be welded corresponds to a welding schedule stored within, for example, the welding job sequencer. The networked welding work cell 600 further includes a scanner 640 (e.g. an RFID scanner or a bar code scanner). The scanner 640 reads workpiece information encoded on the workpiece (e.g., encoded in an RFID tag or a bar code attached to the workpiece) which identifies the workpiece. The scanner 640 sends the workpiece information to the welding job sequencer 200 via the computerized network 610. Upon receiving the workpiece information, the welding job sequencer 200 selects a welding schedule, from multiple welding schedules, based at least in part on the workpiece information. In this manner, the workpiece information does not have to be manually entered and the welding schedule does not have to be manually selected by a human operator.

Figure 7:
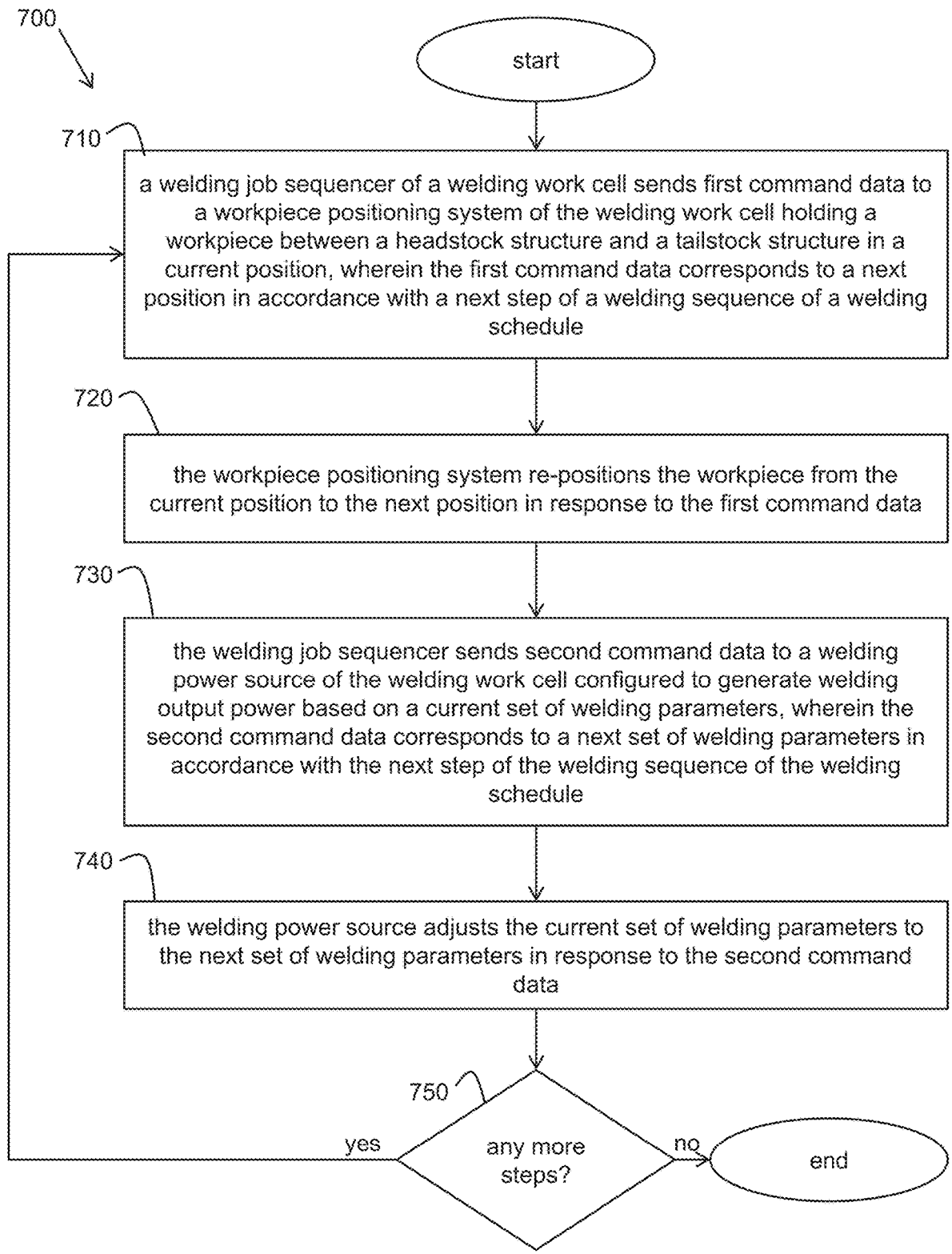
FIG. 7 is a flowchart of one embodiment of a method of manipulating a welding work cell.

FIG. 7 is a flowchart of one embodiment of a method 700 of manipulating a welding work cell (e.g., the welding work cell 10 of FIG. 2 or the welding work cell 600 of FIG. 6). At block 710 of the method 700, a welding job sequencer of a welding work cell sends first command data to a workpiece positioning system of the welding work cell. The workpiece positioning system is holding a workpiece between a headstock structure and a tailstock structure of the workpiece positioning system in a current position. For example, the human operator may have just completed welding a current weld on the workpiece while the workpiece was in the current position. The first command data corresponds to a next position in accordance with a next step (e.g., a next weld to be performed) in a welding sequence of a welding schedule. At block 720 of the method 700, the workpiece positioning system re-positions the workpiece from the current position to the next position in response to the first command data. In this manner, the workpiece is put in position for a next weld to be performed by the human operator.

At block 730 of the method 700, the welding job sequencer sends second command data to a welding power source of the welding work cell. The welding power source is configured to generate welding output power based on a current set of welding parameters. For example, the human operator may have just completed welding the current weld on the workpiece using the welding power source set to the current set of welding parameters. The second command data corresponds to a next set of welding parameters in accordance with the next step (e.g., the next weld to be performed) in the welding sequence of the welding schedule. At block 740 of the method 700, the welding power source adjusts the current set of welding parameters to the next set of welding parameters in response to the second command data. In this manner, the welding power source is put in condition for the next weld to be performed by the human operator.

At bock 750 of the method 700, when there are more steps in the welding sequence of the welding schedule to be performed, the method reverts back to block 710 and the process repeats for each successive step (weld) in the sequence until the sequence is completed. In this manner, a welding sequence of a welding schedule may be performed by a human operator where the re-positioning of the workpiece and the adjusting of the welding parameters are automatically performed, without the human operator having to intervene.

In one embodiment, the workpiece positioning system sends confirmation data to the welding job sequencer to confirm that the workpiece has been properly re-positioned in accordance with the first command data. In one embodiment, the welding power source sends confirmation data to the welding job sequencer to confirm that the current set of welding parameters have been properly adjusted to the next set of welding parameters in accordance with the second command data. In one embodiment, the command data and the confirmation data are communicated wirelessly (e.g., via WiFi or Bluetooth®). In another embodiment, the command data and the confirmation data are communicated via wired means (e.g., via copper cable or fiber optic cable). In another embodiment, the command data and the confirmation data are communicated over a computerized network (e.g., as in FIG. 6).

The first command data and/or the second command data may be modified by the welding job sequencer based on a user profile of a human operator logged in to at least one of the welding job sequencer, the workpiece positioning system, or the welding power source, in accordance with one embodiment. Instructions are displayed on a human/machine interface (e.g., the user interface 230 of FIG. 4) of the welding job sequencer to instruct the human operator how to perform the next welding operation on the workpiece (i.e., the instructions correspond to the next step of the welding sequence), in accordance with one embodiment.

In this manner, more effective solutions are provided that allow for efficient positioning of workpieces and adjusting of welding parameters during a welding process.

Figure 8:
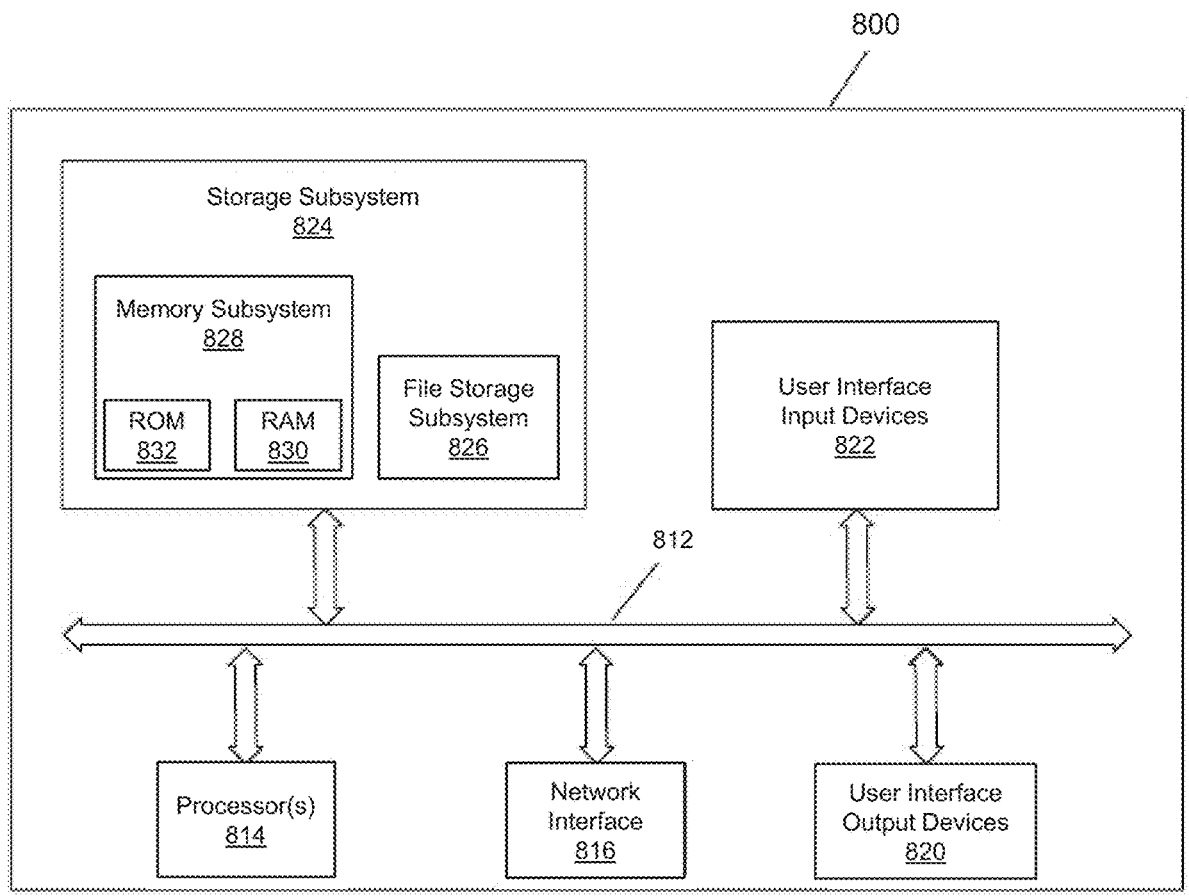
FIG. 8 is an apparatus block diagram illustrating one embodiment of a welding job sequencer.

FIG. 8 illustrates an embodiment of an example welding job sequencer 800 that may be used as the welding job sequencer 200 in FIG. 2, FIG. 4, and FIG. 6. The welding job sequencer 800 includes at least one processor 814 which communicates with a number of peripheral devices via bus subsystem 812. These peripheral devices may include a storage subsystem 824, including, for example, a memory subsystem 828 and a file storage subsystem 826, user interface input devices 822, user interface output devices 820, and a network interface subsystem 816. The input and output devices allow user interaction with the welding job sequencer 800. Network interface subsystem 816 provides an interface to outside networks and is coupled to corresponding interface devices in other computer systems. For example, the workpiece positioning system 100 (e.g., the operator controls 180) or the welding power source 300 may share one or more characteristics with the welding job sequencer 800 and may include, for example, elements of a conventional computer, a digital signal processor, and/or other computing device.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the welding job sequencer 800 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the welding job sequencer 800 to the user or to another machine or computer system.

Storage subsystem 824 stores programming and data constructs that provide some or all of the welding job sequencer functionality described herein. For example, the storage subsystem 824 may include one or more software modules including computer executable instructions for adjusting a next position of a welding sequence and/or a next set of welding parameters of the welding sequence based on a user profile of the human operator stored in the storage subsystem 824.

These software modules are generally executed by processor 814 alone or in combination with other processors. Memory subsystem 828 used in the storage subsystem can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 826 in the storage subsystem 824, or in other machines accessible by the processor(s) 814.

Bus subsystem 812 provides a mechanism for letting the various components and subsystems of the welding job sequencer 800 communicate with each other as intended. Although bus subsystem 812 is shown schematically as a single bus, alternative embodiments of the bus subsystem may use multiple buses.

The welding job sequencer 800 can be of various implementations including a single computer, a single workstation, a computing cluster, a server computer, or any other data processing system or computing device configured to perform the welding job sequencer functions described herein. Due to the ever-changing nature of computing devices and networks, the description of the welding job sequencer 800 depicted in FIG. 8 is intended only as a specific example for purposes of illustrating some embodiments. Many other configurations of the welding job sequencer 800 are possible having more or fewer components than the welding job sequencer depicted in FIG. 8.

In accordance with some embodiments, any of the interface controller 180 of FIG. 3, the welding power source 300 of FIG. 5, and the server computer 615 of FIG. 6 may share similar elements and configurations to that of the welding job sequencer 800 of FIG. 8. Furthermore, the network storage device 620 of FIG. 6 may be configured in a similar manner to the storage subsystem 824 of FIG. 8, in accordance with one embodiment.

While the disclosed embodiments have been illustrated and described in considerable detail, it is not the intention to restrict or in any way limit the scope of the claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. For example, alternative methods and/or systems with additional or alternative components may be utilized to configure a workpiece positioning system to allow for easier positioning of otherwise difficult-to-position workpieces for welding or cutting. It is sought, therefore, to cover all such changes and modifications as fall within the spirit and scope of the general inventive concepts, as defined by the claims, and equivalents thereof.

What is claimed is:

1. A welding work cell comprising:
    a workpiece positioning system configured to power an elevating motion to adjust a height position of a workpiece and a rotational motion to adjust a rotational position of the workpiece to re-position the workpiece for a next weld to be performed by a human operator;
    a welding power source configured to generate welding output power based on a current set of welding parameters of the welding power source, wherein the welding power source is part of a welding system used by the human operator for welding the workpiece; and
    a welding job sequencer in communication with the workpiece positioning system and the welding power source and configured to:
        command the workpiece positioning system to re-position the workpiece from a current weld position to a next weld position in accordance with a next step of a welding sequence of a welding schedule, and
        command the welding power source to adjust the current set of welding parameters to a next set of welding parameters in accordance with the next step of the welding sequence of the welding schedule,
    wherein the welding power source is configured to send confirmation data to the welding job sequencer to confirm that the current set of welding parameters have been properly adjusted to the next set of welding parameters.

2. The welding work cell of claim 1, wherein the next set of welding parameters commanded by the welding job sequencer is adjusted based on a user profile corresponding to the human operator when the human operator is logged into at least one of the welding job sequencer, the welding power source, or the workpiece positioning system.

3. The welding work cell of claim 1, wherein the workpiece positioning system includes an interface controller comprising:
    a communication interface configured to communicate with at least the welding job sequencer;
    a memory storing at least one of user profiles or runtime files that include program data that is compiled and saved in an executable format to be used for human/machine interface applications;
    at least one of a processor or a programmable logic controller; and
    a human/machine interface including at least one of a graphical touch panel interface or push buttons.

4. The welding work cell of claim 1, wherein the workpiece positioning system includes:
    a headstock structure;
    a tailstock structure;
    a first hydraulic cylinder, a first pair of linear rails with bearings, a first hydraulic power unit, and a first linear encoder housed in the headstock structure; and
    a second hydraulic cylinder, a second pair of linear rails with bearings, a second hydraulic power unit, and a second linear encoder housed in the tailstock structure,
    wherein the first hydraulic cylinder, the first hydraulic power unit, the second hydraulic cylinder, and the second hydraulic power unit are configured to power the elevating motion of the workpiece along the first pair of linear rails and the second pair of linear rails in synchronization, wherein the synchronization is provided by the first linear encoder and the second linear encoder.

5. The welding work cell of claim 1, wherein the welding job sequencer includes:
    a communication interface configured to communicate with at least the workpiece positioning system and the welding power source;
    a processor;
    a human/machine interface configured to provide the human operator with commands and instructions corresponding to the next weld to be performed by the human operator; and
    a memory, wherein the memory stores at least one of the welding schedules, user profiles, or runtime files that include program data that is compiled and saved in an executable format to be used for human/machine interface applications.

6. The welding work cell of claim 1, wherein the welding power source includes:
    a communication interface configured to communicate with at least the welding job sequencer;
    a memory storing a set of user profiles and sets of welding parameters;
    power generation electronics;
    a waveform generator;
    a processor/controller; and
    a human/machine interface.

7. A method of manipulating a welding work cell, the method comprising:
    a welding job sequencer of the welding work cell sending first command data to a workpiece positioning system of the welding work cell holding a workpiece in a current weld position, wherein the first command data corresponds to a next weld position in accordance with a next step of a welding sequence of a welding schedule;
    the workpiece positioning system, configured to power an elevating motion to adjust a height position of the workpiece and a rotational motion to adjust a rotational position of the workpiece, re-positioning the workpiece from the current weld position to the next weld position in response to the first command data for a next welding operation to be performed by a human operator;

the welding job sequencer sending second command data to a welding power source of the welding work cell configured to generate welding output power based on a current set of welding parameters, wherein the second command data corresponds to a next set of welding parameters in accordance with the next step of the welding sequence of the welding schedule; and the welding power source adjusting the current set of welding parameters to the next set of welding parameters in response to the second command data, and the welding power source sending confirmation data to the welding job sequencer to confirm that the current set of welding parameters have been properly adjusted to the next set of welding parameters in accordance with the second command data.

8. The method of claim 7, further comprising the workpiece positioning system sending confirmation data to the welding job sequencer to confirm that the workpiece has been properly re-positioned in accordance with the first command data before sending the second command data to the welding power source.

9. The method of claim 7, further comprising displaying instructions, corresponding to the next step of the welding sequence, on a human/machine interface of the welding job sequencer to instruct the human operator to perform the next welding operation on the workpiece.

10. The method of claim 7, wherein the first command data is sent wirelessly from the welding job sequencer to the workpiece positioning system.

11. The method of claim 7, wherein the second command data is sent wirelessly from the welding job sequencer to the welding power source.

12. The method of claim 7, further comprising modifying at least one of the first command data and the second command data based on a user profile of the human operator logged in to at least one of the welding job sequencer, the workpiece positioning system, or the welding power source.

13. A networked welding work cell comprising:
a workpiece positioning system configured to power an elevating motion to adjust a height position of a workpiece and a rotational motion to adjust a rotational position of the workpiece to re-position the workpiece for a next weld to be performed by a human operator;
a welding power source configured to generate welding output power based on a current set of welding parameters of the welding power source, wherein the welding power source is part of a welding system used by the human operator for welding the workpiece;
a computerized network;
a welding job sequencer in communication with the workpiece positioning system and the welding power source via the computerized network, wherein the welding job sequencer is configured to:
command the workpiece positioning system to re-position the workpiece from a current weld position to a next weld position in accordance with a next step of a welding sequence of a welding schedule, and
command the welding power source to adjust the current set of welding parameters to a next set of welding parameters in accordance with the next step of the welding sequence of the welding schedule,
wherein the welding power source is configured to send confirmation data to the welding job sequencer to confirm that the current set of welding parameters have been properly adjusted to the next set of welding parameters.

14. The networked welding work cell of claim 13, further comprising a body proximity sensor configured to sense when the human operator is not in a safe location and to stop movement of the workpiece positioning system in response to sensing when the human operator is not in a safe location.

15. The networked welding work cell of claim 13, further comprising a scanner configured to read workpiece information encoded on the workpiece and send the workpiece information to the welding job sequencer, wherein the welding job sequencer is configured to select the welding schedule from a plurality of welding schedules based on the workpiece information.

16. The networked welding work cell of claim 13, wherein the computerized network includes at least one of a server computer and a network storage device storing user profiles.

17. The networked welding work cell of claim 13, wherein the networked welding work cell is configured as at least one of a local area network or a wide area network.

18. The networked welding work cell of claim 13, wherein the networked welding work cell is configured as a wireless network.

* * * * *